United States Patent
Cho et al.

(10) Patent No.: US 9,042,456 B2
(45) Date of Patent: May 26, 2015

(54) MOVING PICTURE ENCODING/DECODING APPARATUS AND METHOD FOR PROCESSING OF MOVING PICTURE DIVIDED IN UNITS OF SLICES

(75) Inventors: Dae-sung Cho, Seoul (KR); Woong-il Choi, Hwaseong-si (KR); Kwan-woong Song, Seongnam-si (KR); Young-hun Joo, Yongin-si (KR); Yong-serk Kim, Seoul (KR); Dong-Gyu Sim, Seoul (KR); Jung-Hak Nam, Seoul (KR); Bong-Il Ji, Seoul (KR)

(73) Assignees: SAMSUNG ELECTRONICS CO., LTD., Suwon-si (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 420 days.

(21) Appl. No.: 13/128,723

(22) PCT Filed: Nov. 5, 2009

(86) PCT No.: PCT/KR2009/006484
§ 371 (c)(1),
(2), (4) Date: May 11, 2011

(87) PCT Pub. No.: WO2010/056013
PCT Pub. Date: May 20, 2010

(65) Prior Publication Data
US 2011/0211642 A1    Sep. 1, 2011

(30) Foreign Application Priority Data
Nov. 11, 2008    (KR) .................. 10-2008-0111850

(51) Int. Cl.
H04N 7/26    (2006.01)
H04N 19/436    (2014.01)
(Continued)

(52) U.S. Cl.
CPC ........... *H04N 19/436* (2014.11); *H04N 19/102* (2014.11); *H04N 19/61* (2014.11); *H04N 19/156* (2014.11); *H04N 19/174* (2014.11)

(58) Field of Classification Search
CPC .................. H04N 19/00012; H04N 19/00206; H04N 19/00272; H04N 19/00521; H04N 19/00781; H04N 7/50; H04N 7/26244; H04N 5/145; H04N 7/26765; H04N 7/26015
USPC .................................................... 375/240.16
See application file for complete search history.

(56) References Cited

U.S. PATENT DOCUMENTS
5,838,383 A * 11/1998 Chimoto et al. ............. 348/553
5,920,353 A * 7/1999 Diaz et al. ................. 375/240.15
(Continued)

FOREIGN PATENT DOCUMENTS
CN    1328748 A    12/2001
CN    101064848 A    10/2007
(Continued)

OTHER PUBLICATIONS
Wu et al, A 4x4 Pipelined Intra Frame Decoder for H.264, 2009.*
(Continued)

*Primary Examiner* — Shan Elahi
(74) *Attorney, Agent, or Firm* — Sughrue Mion, PLLC (57) ABSTRACT

A moving picture encoding/decoding apparatus and method for processing a moving picture, which is divided in units of slices are provided. The encoding method includes: dividing a moving picture in units of slices when the moving picture is received; determining an encoding order of moving pictures divided in units of slices; and generating a bitstream by encoding moving pictures, which are divided in units of slices, according to a corresponding order when the encoding order had been determined.

2 Claims, 7 Drawing Sheets

(51) Int. Cl.
*H04N 19/102* (2014.01)
*H04N 19/61* (2014.01)
*H04N 19/156* (2014.01)
*H04N 19/174* (2014.01)

(56) References Cited

U.S. PATENT DOCUMENTS

| | | | |
|---|---|---|---|
| 6,008,853 A * | 12/1999 | Narayan et al. | 375/240.24 |
| 6,014,171 A * | 1/2000 | Koyanagi et al. | 375/240.01 |
| 6,307,975 B1 * | 10/2001 | Hosaka et al. | 382/243 |
| 6,332,003 B1 * | 12/2001 | Matsuura et al. | 375/240.23 |
| 7,177,520 B2 | 2/2007 | Zetts | |
| 7,751,481 B2 * | 7/2010 | Adachi et al. | 375/240.12 |
| 8,023,562 B2 * | 9/2011 | Zheludkov et al. | 375/240.16 |
| 8,090,025 B2 * | 1/2012 | Sakazume | 375/240.16 |
| 8,275,208 B2 * | 9/2012 | Moon et al. | 382/232 |
| 8,724,695 B2 * | 5/2014 | Bock | 375/240.01 |
| 2001/0040926 A1 * | 11/2001 | Hannuksela et al. | 375/240.27 |
| 2002/0009143 A1 * | 1/2002 | Arye | 375/240.16 |
| 2002/0031184 A1 * | 3/2002 | Iwata | 375/240.23 |
| 2002/0035732 A1 | 3/2002 | Zetts | |
| 2002/0054638 A1 * | 5/2002 | Hanamura et al. | 375/240.03 |
| 2002/0059643 A1 | 5/2002 | Kitamura et al. | |
| 2002/0071485 A1 * | 6/2002 | Caglar et al. | 375/240.01 |
| 2002/0114397 A1 * | 8/2002 | Todo et al. | 375/240.29 |
| 2002/0181580 A1 * | 12/2002 | Van Der Schaar | 375/240.01 |
| 2003/0227969 A1 * | 12/2003 | Wise et al. | 375/240.1 |
| 2004/0151252 A1 * | 8/2004 | Sekiguchi et al. | 375/240.25 |
| 2004/0221143 A1 * | 11/2004 | Wise et al. | 712/300 |
| 2005/0105621 A1 * | 5/2005 | Ju | 375/240.17 |
| 2005/0117655 A1 * | 6/2005 | Ju | 375/240.28 |
| 2005/0123038 A1 * | 6/2005 | Otsuka et al. | 375/240.03 |
| 2005/0147174 A1 * | 7/2005 | Iwata | 375/240.23 |
| 2006/0171463 A1 * | 8/2006 | Hanamura et al. | 375/240.13 |
| 2006/0268989 A1 * | 11/2006 | Kadono et al. | 375/240.23 |
| 2007/0253491 A1 | 11/2007 | Ito et al. | |
| 2007/0286288 A1 * | 12/2007 | Smith et al. | 375/240.24 |
| 2008/0152020 A1 | 6/2008 | Kayashima et al. | |
| 2008/0181300 A1 * | 7/2008 | Hosaka et al. | 375/240.03 |
| 2008/0181522 A1 * | 7/2008 | Hosaka et al. | 382/251 |
| 2008/0225949 A1 * | 9/2008 | Adachi et al. | 375/240.12 |
| 2008/0310555 A1 | 12/2008 | Kee | |
| 2009/0169123 A1 * | 7/2009 | Park et al. | 382/243 |
| 2009/0310669 A1 * | 12/2009 | Konoshima | 375/240.01 |
| 2010/0002943 A1 * | 1/2010 | Moon et al. | 382/233 |
| 2010/0150231 A1 * | 6/2010 | Huang et al. | 375/240.12 |

FOREIGN PATENT DOCUMENTS

| | | |
|---|---|---|
| CN | 101137062 A | 3/2008 |
| CN | 101267564 A | 9/2008 |
| KR | 10-0801630 B1 | 1/2008 |
| WO | 0021302 A1 | 4/2000 |

OTHER PUBLICATIONS

International Search Report for PCT/KR2009/006484 issued Jun. 7, 2010 [PCT/ISA/210].

Written Opinion for PCT/KR2009/006484 issued Jun. 7, 2010 [PCT/ISA/237].

Communication dated Apr. 3, 2013 from the State Intellectual Property Office of P.R. China in counterpart Chinese application No. 200980145417.4.

Communication dated Dec. 18, 2013 issued by the State Intellectual Property Office of the People's Republic of China in counterpart Chinese Patent Application No. 200980145417.4.

* cited by examiner

| | | | | | | | | | |
|---|---|---|---|---|---|---|---|---|---|
| $t_1$ 162-1 | $t_3$ 162-3 | $t_5$ 162-5 | $t_7$ 162-7 | $t_9$ 162-9 | $t_{11}$ 162-11 | $t_{13}$ 162-13 | $t_{15}$ 162-15 | $t_{17}$ 162-17 | |
| $t_2$ 162-2 | $t_4$ 162-4 | $t_6$ 162-6 | $t_8$ 162-8 | $t_{10}$ 162-10 | $t_{12}$ 162-12 | $t_{14}$ 162-14 | $t_{16}$ 162-16 | | |
| $t_5$ 164-5 | $t_7$ 164-7 | $t_9$ 164-9 | $t_{11}$ 164-11 | $t_{13}$ 164-13 | $t_{15}$ 164-15 | $t_{17}$ 164-17 | | | |
| $t_6$ 164-6 | $t_8$ 164-8 | $t_{10}$ 164-10 | $t_{12}$ 164-12 | $t_{14}$ 164-14 | $t_{16}$ 164-16 | | | | |
| $t_9$ 166-9 | $t_{11}$ 166-11 | $t_{13}$ 166-13 | $t_{15}$ 166-15 | $t_{17}$ 166-17 | | | | | |
| $t_{10}$ 166-10 | $t_{12}$ 166-12 | $t_{14}$ 166-14 | $t_{16}$ 166-16 | | | | | | |
| $t_{13}$ 168-13 | $t_{15}$ 168-15 | $t_{17}$ 168-17 | | | | | | | |
| $t_{14}$ 168-14 | $t_{16}$ 168-16 | | | | | | | | |
| $t_{17}$ 170-17 | | | | | | | | | |
| | | | | | | | | | |

Braces: rows 1-2 → 162; rows 3-4 → 164; rows 5-6 → 166; rows 7-8 → 168; rows 9-10 → 170

Fig. 8

| | | | | | | | | | |
|---|---|---|---|---|---|---|---|---|---|
| $t_1$ 162-1 | $t_2$ 162-2 | $t_3$ 162-3 | $t_4$ 162-4 | $t_5$ 162-5 | $t_6$ 162-6 | $t_7$ 162-7 | $t_8$ 162-8 | $t_9$ 162-9 | |
| $t_3$ 164-3 | $t_4$ 164-4 | $t_5$ 164-5 | $t_6$ 164-6 | $t_7$ 164-7 | $t_8$ 164-8 | $t_9$ 164-9 | | | |
| $t_5$ 166-5 | $t_6$ 166-6 | $t_7$ 166-7 | $t_8$ 166-8 | $t_9$ 166-9 | | | | | |
| $t_7$ 168-7 | $t_8$ 168-8 | $t_9$ 168-9 | | | | | | | |
| $t_9$ 170-9 | | | | | | | | | |
| 172-11 | | | | | | | | | |
| 174-13 | | | | | | | | | |
| 176-15 | | | | | | | | | |
| 178-17 | | | | | | | | | |
| 180-19 | | | | | | | | | |

Row labels: 162, 164, 166, 168, 170, 172, 174, 176, 178, 180

| | | | | | | | | | |
|---|---|---|---|---|---|---|---|---|---|
| | | | | | | | | | |
| | | | | | | | | | |
| | | | | | | | | | |
| $t_6$ | $t_7$ | $t_8$ | $t_9$ | $t_{10}$ → | | | | | |
| 162-6 | 162-7 | 162-8 | 162-9 | 162-10 | | | | | |
| $t_1$ | $t_2$ | $t_3$ | $t_4$ | $t_5$ → | $t_6$ | $t_7$ | $t_8$ | $t_9$ | $t_{10}$ → |
| 162-1 | 162-2 | 162-3 | 162-4 | 162-5 | 164-6 | 164-7 | 164-8 | 164-9 | 164-10 |
| $t_2$ | $t_3$ | $t_4$ | $t_5$ | $t_6$ | $t_7$ | $t_8$ | $t_9$ | $t_{10}$ → | |
| 166-2 | 166-3 | 166-4 | 166-5 | 166-6 | 168-7 | 168-8 | 168-9 | 168-10 | |
| $t_7$ | $t_8$ | $t_9$ | $t_{10}$ → | | | | | | |
| 166-7 | 166-8 | 166-9 | 166-10 | | | | | | |
| | | | | | | | | | |
| | | | | | | | | | |
| | | | | | | | | | |

| | | | | | | | | | |
|---|---|---|---|---|---|---|---|---|---|
| | | | | | | | | | |
| | | | | | | | | | |
| | | | | | | | | | |
| ← $t_{10}$ | $t_9$ | $t_8$ | $t_7$ | $t_6$ | $t_7$ | $t_8$ | $t_9$ | $t_{10}$ → | |
| 162-10 | 162-9 | 162-8 | 162-7 | 162-6 | 164-7 | 164-8 | 164-9 | 164-10 | |
| ← $t_5$ | $t_4$ | $t_3$ | $t_2$ | $t_1$ | $t_2$ | $t_3$ | $t_4$ | $t_5$ | $t_6$ |
| 162-5 | 162-4 | 162-3 | 162-2 | 162-1 | 164-2 | 164-3 | 164-4 | 164-5 | 164-6 |
| ← $t_6$ | $t_5$ | $t_4$ | $t_3$ | $t_2$ | $t_3$ | $t_4$ | $t_5$ | $t_6$ | $t_7$ → |
| 166-6 | 166-5 | 166-4 | 166-3 | 166-2 | 166-3 | 166-4 | 166-5 | 166-6 | 166-7 |
| | ← $t_{10}$ | $t_9$ | $t_8$ | $t_7$ | $t_8$ | $t_9$ | $t_{10}$ → | | |
| | 166-10 | 166-9 | 166-8 | 166-7 | 168-8 | 168-9 | 168-10 | | |
| | | | | | | | | | |
| | | | | | | | | | |
| | | | | | | | | | |

162 / 164 / 166 / 168

Fig. 13

MOVING PICTURE ENCODING/DECODING APPARATUS AND METHOD FOR PROCESSING OF MOVING PICTURE DIVIDED IN UNITS OF SLICES

CROSS-REFERENCE TO RELATED APPLICATIONS

This application is a National Stage application under 35 U.S.C. §371 of PCT/KR2009/006484 filed on Nov. 5, 2009, which claims priority from Korean Patent Application No. 10-2008-0111850 filed on Nov. 11, 2008 in the Korean Intellectual Property Office, all the disclosures of which are incorporated herein in their entireties by reference.

BACKGROUND

1. Field

Apparatuses and methods consistent with exemplary embodiments relate to a moving picture encoding/decoding apparatus and method for processing of a moving picture, which is divided in units of slices.

2. Description of the Related Art

In general, the amount of computation performed for motion estimation greatly affects the total amount of computation required for coding. For example, when motion estimation is performed with one or more forward/backward reference frames, as in the H.264/AVC compression encoding scheme, the complexity thereof is very high. Especially, in the case of an MPEG-4 AVC/H.264 compression video structure, when motion estimation with respect to a hierarchical B-picture is performed using various blocks in order to achieve temporal scalability, the complexity thereof increases exponentially.

Meanwhile, recently, with the development of multi-core technology, a greater number of moving picture encoding/decoding apparatuses based on parallel processing have been developed. According to a parallel processing method using H.264/AVC, which is a recent moving picture compression standard, an image is divided into regions, each of which is called a "slice," and each slice image region is individually encoded or decoded in each process or thread. Since the parallel processing method does not require information to be shared and transferred between image regions of slices, into which an image is divided, the parallel processing method has advantages in that the implementation thereof is easy and the efficiency of parallel processing is excellent.

Figure 1:
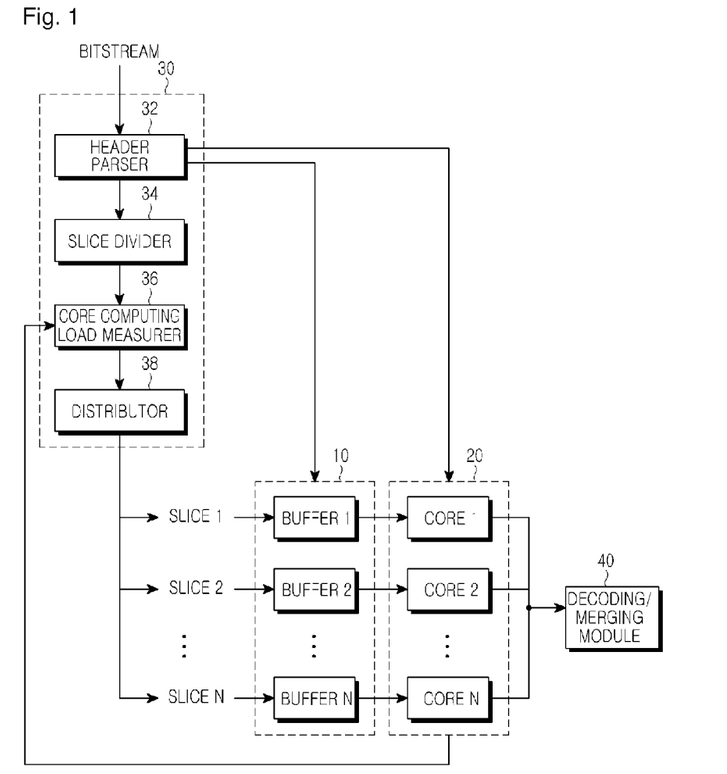
FIG. 1 is a block diagram schematically illustrating the configuration of a conventional moving picture encoding apparatus for processing a moving picture divided in units of slices.

FIG. 1 is a block diagram schematically illustrating the configuration of a conventional moving picture encoding apparatus for processing a moving picture divided in units of slices.

The moving picture encoding apparatus includes a memory 10, a multi-core processor 20, an MPEG data division module 30, and a decoding/merging module 40.

According to the conventional moving picture encoding apparatus, one-frame data of a bitstream encoded by an MPEG algorithm is stored in the memory 10, is allocated as threads to cores within the multi-core processor 20, is decoded, and is then merged.

The multi-core processor 20 includes a plurality of cores, i.e. central processing units (CPUs), which operate thread by thread, wherein each core operates independently. The memory 10 includes a plurality of buffers which store individual slices (e.g. slice 1, slice 2, ..., slice N) received from the MPEG data division module 30, and provide the stored slices to cores (core 1, core 2, ..., core N) of the multi-core processor 20.

The MPEG data division module 30, when receiving MPEG data, extracts decoding information, divides the received MPEG data into slices, and distributes decoding processes for bitstreams based on the divided individual slice units to the cores in the multi-core processor as threads. To this end, the MPEG data division module 30 includes a header parser 32, a slice divider 34, a core computing load measurer 36, and a distributor 38.

The header parser 32 receives MPEG data in the form of a bitstream, and performs a basic header parsing operation, such as extraction of decoding information. In addition, the header parser 32 divides and allocates the region of the memory 10 so as to prepare the buffers for the slices. That is, the header parser 32 divides the region of the memory 10 into a plurality of buffers so as to correspond to the cores of the multi-core processor 20, and allocates the buffers to the cores.

The slice divider 34 detects a slice start code within a bitstream and divides the bitstream in units of slices. The distributor 38 properly distributes bitstreams divided in units of slices to the buffers. The core computing load measurer 36 measures a computing occupancy of each core.

Meanwhile, referring to FIG. 1, many moving picture codecs use a parallel processing scheme of dividing an image into slices and allocating the slices to cores, respectively, in order to support parallel processing in a multi-core environment. However, such a scheme degrades the encoding performance as a whole, as compared with a scheme of encoding the entire image.

Therefore, there is a necessity for a parallel processing-based moving picture encoding/decoding apparatus which can enhance the efficiency in encoding or decoding of a moving picture through an efficient slice division.

SUMMARY

One or more exemplary embodiments provide a moving picture encoding/decoding apparatus and method for processing of a moving picture, which is divided in units of slices.

In accordance with an aspect of an exemplary embodiment, there is provided a moving picture encoding apparatus for processing a moving picture which is divided in units of slices; the apparatus including: a slice divider which divides an input image into image slices in units of slices; an image encoder including a plurality of encoding units which receive and encode the image slices, respectively; a bitstream generator which generates a bitstream through use of the encoded image slices; and a synchronization controller which determines an encoding order of the image slices, and controlling the encoding units to encode the image slices in parallel according to the encoding order.

In accordance with another exemplary embodiment, there is provided a moving picture decoding apparatus for processing a moving picture which is divided in units of slices; the apparatus including: a slice divider which divides an input bitstream into bitstream slices in units of slices; an image decoder including a plurality of decoding units which receive and decode the bitstream slices, respectively; and a synchronization controller which determines a decoding order of the bitstream slices, and controlling the decoding units to decode the bitstream slices in parallel according to the decoding order.

In accordance with another aspect of an exemplary embodiment, there is provided an encoding method by a moving picture encoder which includes a plurality of encoding units for processing a moving picture divided in units of slices, the method including the steps of: dividing an input image into image slices in units of slices; determining an encoding order of a plurality of macroblocks included in the image slices into which the input image is divided; simultaneously encoding the respective image slices according to the encoding order through use of the encoding units; and generating a bitstream through use of the encoded image slices.

In accordance with another aspect of an exemplary embodiment, there is provided a decoding method by a moving picture decoder which includes a plurality of decoding units for processing a moving picture divided in units of slices, the method including: dividing an input bitstream into bitstream slices in units of slices; determining a decoding order of a plurality of macroblocks included in the bitstream slices into which the input bitstream is divided; and simultaneously decoding the respective bitstream slices according to the decoding order through use of the decoding units.

According to another aspect of an exemplary embodiment it is possible to increase the encoding efficiency through the sharing of partial information between image slices.

According to yet another aspect of an exemplary embodiment it is possible to process a moving picture divided in units of slices.

BRIEF DESCRIPTION OF THE DRAWINGS

The above and/or other aspects, features and advantages of the exemplary embodiments will be more apparent from the following detailed description taken in conjunction with the accompanying drawings, in which.

DETAILED DESCRIPTION OF EXEMPLARY EMBODIMENTS

Hereinafter, exemplary embodiments will be described with reference to the accompanying drawings. In the following description, the same elements will be designated by the same reference numerals although they are shown in different drawings. In addition, in the following description of the exemplary embodiments, a detailed description of known functions and configurations incorporated herein will be omitted when it may make the subject matter of the exemplary embodiments rather unclear.

Figure 2:
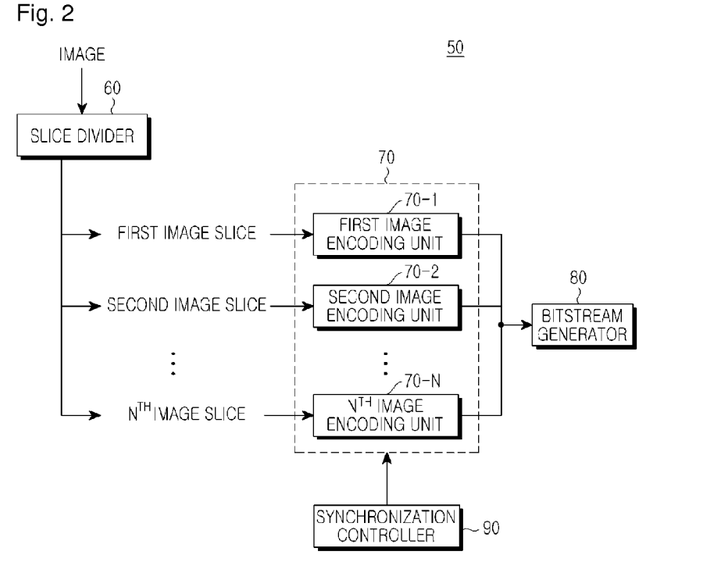
FIG. 2 is a block diagram schematically illustrating the configuration of a moving picture encoding apparatus for processing a moving picture divided in units of slices according to an exemplary embodiment.

FIG. 2 is a block diagram schematically illustrating the configuration of a moving picture encoding apparatus for processing a moving picture divided in units of slices according to an exemplary embodiment.

The moving picture encoding apparatus 50 includes a slice divider 60, an image encoder 70, a synchronization controller 90, and a bitstream generator 80.

The slice divider 60 divides an image, which is input to the moving picture encoding apparatus 50, in units of slices, thereby generating image slices. In the following description, image slices represent images obtained by dividing an image in units of slices. The slice divider 60 can divide an input image into image slices and determine an encoding order for the image slices so that information can be shared between image slices.

In this case, sharing information between image slices signifies that, when the image encoder 70 encodes image slices, each image encoding unit makes reference to a pre-encoded image slice or an image slice, other than an image slice allocated to the image encoding unit itself, in order to encode the allocated image slice, wherein the image encoder 70 will be described later. For example, when a third image encoding unit 70-3 encodes a third image slice, the third image encoding unit 70-3 may make reference to a second image slice encoded in advance, or make reference to a first image slice encoded by a second image encoding unit 70-2.

The image encoder 70 receives at least one image slice obtained by dividing an image in units of slices by the slice divider 60, and encodes the received image slice. The image encoder 70 includes the first image encoding unit 70-1, the second image encoding unit 70-2, the third image encoding unit 70-3, . . . , an $N^{th}$ image encoding unit 70-N, which receive and encode a first image slice, a second image slice, a third image slice, . . . , an $N^{th}$ image slice, respectively.

As described above, when each image encoding unit encodes an image slice allocated to the image encoding unit itself, the image encoding unit may encode the allocated image slice by making an image slice, other than the allocated image slice. In this case, when making reference to another image slice, the image encoder 70 may make reference to information on each image slice in units of macroblocks included in each image slice.

For example, when the second image encoding unit 70-2 encodes a fifth image slice allocated to the second image encoding unit 70-2, the second image encoding unit 70-2 may make reference to a fourth macroblock in a fourth image slice currently being encoded by the third image encoding unit. Information to which the image encoder 70 makes reference from an image slice or a macroblock included in an image slice includes, for example, motion estimation information according to each frame, a motion vector of each macroblock, and the number of coefficients, and such information may be stored in a memory (not shown) included in the moving picture encoding apparatus 50. As described above, the image encoding units shares information between image slices with each other, thereby increasing the encoding efficiency.

The bitstream generator 80 receives each encoded image slice from the first image encoding unit 70-1 through the $N^{th}$ image encoding unit 70-N, and generates a bitstream.

When the image encoder 70 encodes image slices, the synchronization controller 90 synchronizes encoding time points of macroblocks included in the image slices. Each image slice includes at least one macroblock. The synchronization controller 90 according to an exemplary embodiment can simultaneously control the encoding time points of macroblocks included in image slices.

For example, it is assumed that a first image slice includes a first macroblock, a second macroblock, and a third macroblock, and a second image slice includes a fourth macroblock, a fifth macroblock, and a sixth macroblock. In addition, it is assumed that the first image slice is encoded by the first image encoding unit 70-1, and the second image slice is encoded by the second image encoding unit 70-2. The synchronization controller 90 according to an exemplary embodiment can control the first image encoding unit 70-1 and the second image encoding unit 70-2 such that the first macroblock of the first image slice and the fourth macroblock of the second image slice can be simultaneously encoded.

Figure 3:
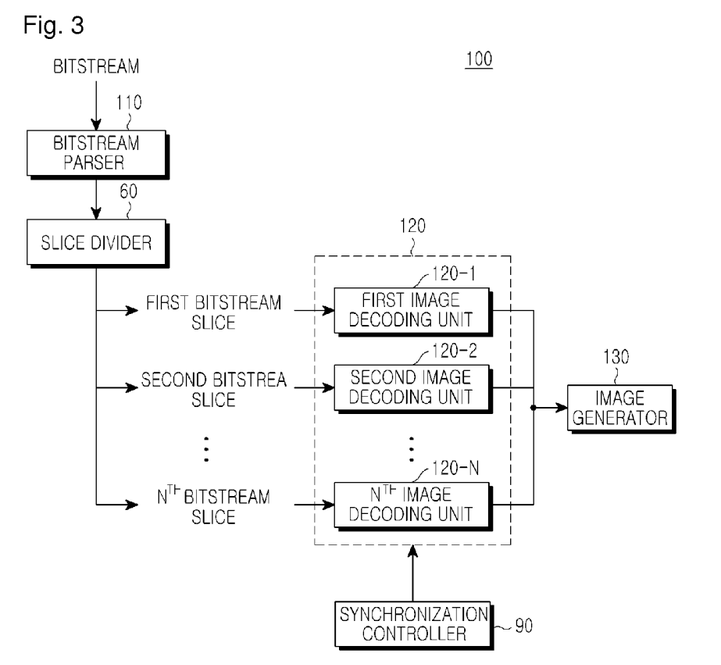
FIG. 3 is a block diagram schematically illustrating the configuration of a moving picture decoding apparatus for processing a moving picture divided in units of slices according to an exemplary embodiment.

FIG. 3 is a block diagram schematically illustrating the configuration of a moving picture decoding apparatus for processing a moving picture divided in units of slices according to an exemplary embodiment.

According to an exemplary embodiment, the moving picture decoding apparatus 100 includes a bitstream parser 110, the slice divider 60, an image decoder 120, an image generator 130, and the synchronization controller 90.

The bitstream parser 110 parses a bitstream input to the moving picture decoding apparatus 100.

The slice divider 60 divides the bitstream, which has been parsed by the bitstream parser 110, in units of slices, thereby generating bitstream slices. Hereinafter, each bitstream obtained by dividing a bitstream in units of slices will be referred to as a "bitstream slice." The slice divider 60 may determine a decoding order of bitstream slices obtained by dividing a bitstream in units of slices. The slice divider 60 transfers first to $N^{th}$ bitstream slices to the image decoder 120 according to the decoding order.

The image decoder 120 decodes at least one bitstream slice which is input in the order determined by the slice divider 60. The image decoder 120 includes a first image decoding unit 120-1, a second image decoding unit 120-2, ..., an $N^{th}$ image decoding unit 120-N, which receive and decode a first bitstream slice, a second bitstream slice, ..., an Nth bitstream slice, respectively.

The image generator 130 receives each decoded bitstream slice, and generates an image. In this case, the generated image may be an image divided into image slices by the moving picture encoding apparatus 50, and may be output and/or reproduced through a display unit (not shown) provided in advance in the moving picture decoding apparatus 100 according to an exemplary embodiment.

When the image decoder 120 decodes bitstream slices, the synchronization controller 90 synchronizes decoding time points of macroblocks included in the bitstream slices. The synchronization controller 90 according to an exemplary embodiment can simultaneously control the decoding time points of macroblocks included in the bitstream slices.

For example, it is assumed that a first bitstream slice includes a first macroblock, a second macroblock, and a third macroblock, and a second bitstream slice includes a fourth macroblock, a fifth macroblock, and a sixth macroblock. In addition, it is assumed that the first bitstream slice is decoded by the first image decoding unit 120-1, and the second bitstream slice is decoded by the second image decoding unit 120-2. The synchronization controller 90 can control the first image decoding unit 120-1 and the second image decoding unit 120-2 such that the first macroblock of the first bitstream slice and the fourth macroblock of the second bitstream slice can be simultaneously decoded.

Figure 4:
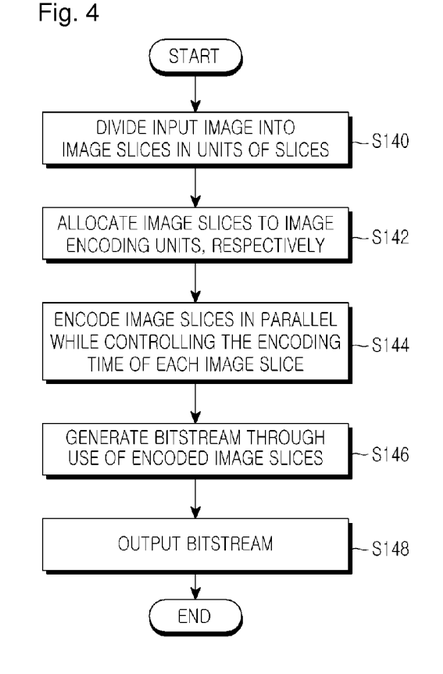
FIG. 4 is a flowchart illustrating a moving picture encoding method for processing a moving picture divided in units of slices according to an exemplary embodiment.

FIG. 4 is a flowchart illustrating a moving picture encoding method for processing a moving picture divided in units of slices according to an exemplary embodiment.

In step 140, the slice divider 60 divides an image, which is input to the moving picture encoding apparatus 50, into image slices based on a slice unit. In step 142, the slice divider 60 allocates the image slices to the image encoder 70, i.e. the image encoding units.

Thereafter, in step 144, the moving picture encoding apparatus 50 encodes the image slices in parallel while controlling the encoding time point of each image slice. In this case, controlling the encoding time point of each image slice is performed by the synchronization controller 90, and encoding the image slices in parallel is performed by the image encoder 70.

When the image slices have been encoded, the bitstream generator 80 generates a bitstream through the use of the encoded image slices in step 146. In step 148, the moving picture encoding apparatus 50 outputs the generated bitstream.

Figure 5:
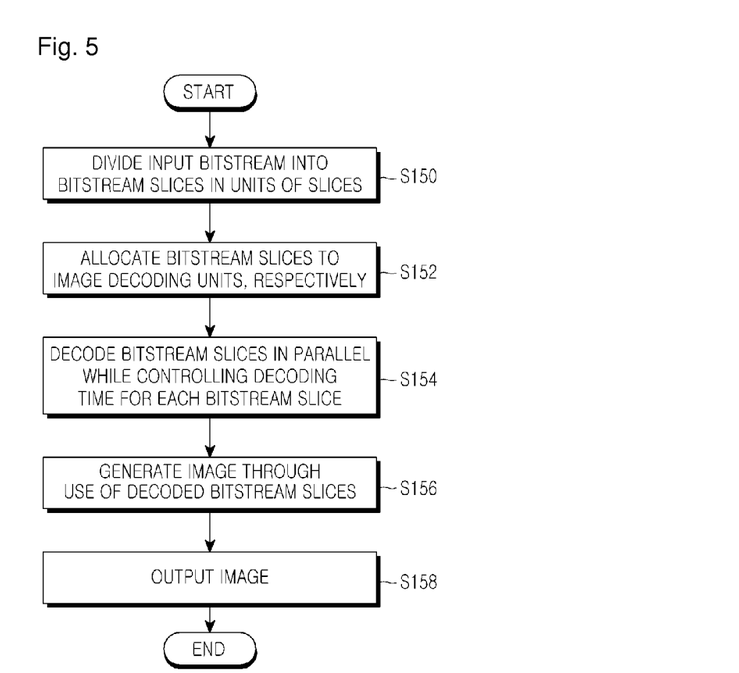
FIG. 5 is a flowchart illustrating a moving picture decoding method for processing a moving picture divided in units of slices according to an exemplary embodiment.

FIG. 5 is a flowchart illustrating a moving picture decoding method for processing a moving picture divided in units of slices according to an exemplary embodiment.

In step 150, the slice divider 60 divides a bitstream, which is input to the moving picture decoding apparatus 100, into bitstream slices based on a slice unit. In step 152, the slice divider 60 allocates the bitstream slices to the image decoder 120, i.e. the image decoding units.

Thereafter, in step 154, the moving picture decoding apparatus 100 decodes the bitstream slices in parallel while controlling the decoding time point of each bitstream slice. In this case, controlling the decoding time point of each bitstream slice is performed by the synchronization controller 90, and decoding the bitstream slices in parallel is performed by the image decoder 120.

When the bitstream slices have been decoded, the image generator 130 generates an image through the use of the decoded bitstream slices in step 156. In step 158, the moving picture decoding apparatus 100 outputs the generated image through a display unit (not shown) provided in advance.

Therefore, according to the exemplary embodiments described above, a moving picture divided in units of slices can be processed.

Figure 6:
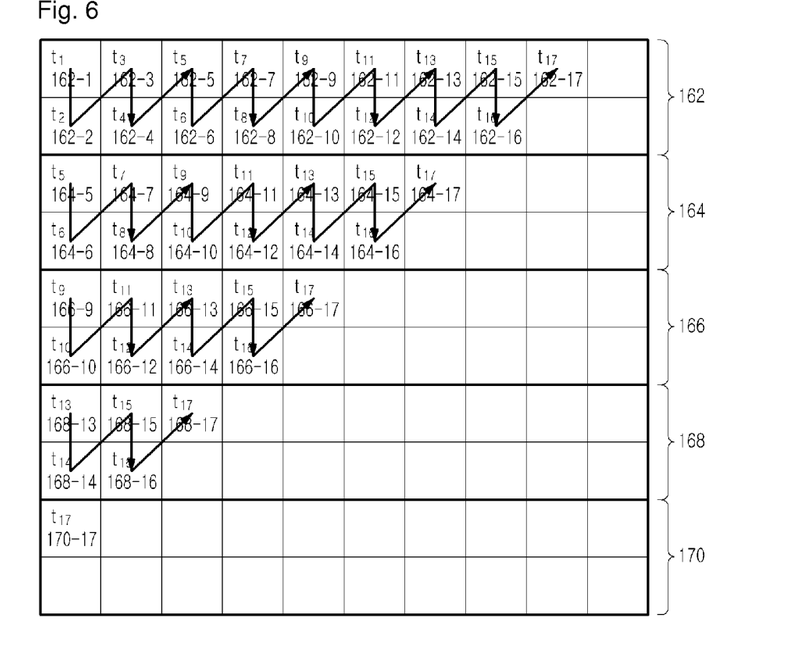
FIG. 6 is a view illustrating a moving picture encoding order in image slices according to an exemplary embodiment.

FIG. 6 is a view illustrating a moving picture encoding order in image slices according to an exemplary embodiment.

FIG. 6 shows one frame of a moving picture. Referring to FIG. 6, one frame includes a first image slice 162, a second image slice 164, a third image slice 166, a fourth image slice 168, and a fifth image slice 170. In addition, each of image slices 162, 164, 166, 168, and 170 includes 20 macroblocks.

It is assumed that a first image encoding unit 70-1 encodes the first image slice 162, a second image encoding unit 70-2 encodes the second image slice 164, a third image encoding unit 70-3 encodes the third image slice 166, a fourth image encoding unit 70-4 encodes the fourth image slice 168, and a fifth image encoding unit 70-5 encodes the fifth image slice 170.

According to an exemplary embodiment, the first image encoding unit 70-1 encodes macroblocks included in the first image slice 162 in the order of "162-1($t_1$)", "162-2($t_2$)", "162-3($t_3$)", "162-4($t_4$)", "162-5($t_5$)", "162-6($t_6$)", "162-7($t_7$)", "162-8($t_8$)", ..., "162-N($t_N$)". Similarly, the second image encoding unit 70-2 encodes macroblocks included in the second image slice 164 in the order of "164-5($t_5$)", "164-6($t_6$)", "164-7($t_7$)", "164-8($t_8$)", "164-9($t_9$)", "164-10($t_{10}$)", "164-11($t_{11}$)", "164-12($t_{12}$)", "164-13($t_{13}$)", ..., "164-N($t_N$)"; the third image encoding unit 70-3 encodes the third image slice 166 in the order of "166-9($t_9$)", "166-10($t_{10}$)", "166-11($t_{11}$)", "166-12($t_{12}$)", "166-13($t_{13}$)", "166-14($t_{14}$)", "166-15($t_{15}$)", "166-16($t_{16}$)", ..., "166-N($t_N$)"; the fourth image encoding unit 70-4 encodes the fourth image slice 168 in the order of "168-13($t_{13}$)", "168-14($t_{14}$)", "168-15($t_{15}$)", "168-16($t_{16}$)", "168-17($t_{17}$)", "168-18($t_{18}$)", "168-19($t_{19}$)", "168-20($t_{20}$)", . . . , "168-N($t_N$)"; and the fifth image encoding unit 70-5 encodes the fifth image slice 170 in the order of "170-17($t_{17}$)", "170-18($t_{18}$)", "170-19($t_{19}$)", "170-20($t_{20}$)", "170-21($t_{21}$)", "170-22($t_{22}$)", . . . , "170-N($t_N$)". In the above description, each numeral expressed in parentheses represents an encoding time point of each corresponding macroblock. For example, macroblock 170-21 starts to be encoded at time point $t_{21}$ by the fifth image encoding unit 70-5.

Referring to FIG. 6, the first image encoding unit 70-1 encodes macroblock 162-1($t_1$) first of all. Since macroblock 162-1($t_1$), which is a macroblock (hereinafter, referred to as an "adjacent macroblock") adjacent to macroblock 162-2($t_2$), has already been encoded, the first image encoding unit 70-1 can make reference to macroblock 162-1($t_1$) when encoding macroblock 162-2($t_2$). Similarly, the first image encoding unit 70-1 encodes macroblock 162-3($t_3$) by making reference to macroblocks 162-1($t_1$) and 162-2($t_2$). Also, when macroblock 162-3($t_3$) has been encoded, the first image encoding unit 70-1 encodes macroblock 162-4($t_4$) by making reference to macroblocks 162-1($t_1$), 162-2($t_2$), and 162-3($t_3$), which correspond to adjacent macroblocks of macroblock 162-4($t_4$). Also, in the same manner, the first image encoding unit 70-1 encodes macroblock 162-5($t_5$) by making reference to macroblocks 162-3($t_3$) and 162-4($t_4$). Here, the range of adjacent macroblocks may be determined in such a manner that, for example, referring to FIG. 6, the adjacent macroblocks of macroblock 164-4 in the second image slice 164 correspond to macroblocks 162-1, 162-2, 162-3, 164-3, 164-5, 166-5, 166-6, and 166-7.

In addition, when adjacent macroblocks 162-2($t_2$) and 162-4($t_4$) of macroblock 164-5($t_5$) have been encoded, the second image encoding unit 70-2 can encode macroblock 164-5($t_5$). That is, a time point at which the first image encoding unit 70-1 encodes macroblock 162-5($t_5$) and a time point at which the second image encoding unit 70-2 encodes macroblock 164-5($t_5$) become equal $t_o$ each other. In this case, the synchronization controller 90 controls the first image encoding unit 70-1 and the second image encoding unit 70-2 so that a time point at which the first image encoding unit 70-1 encodes macroblock 162-5($t_5$) can be equal to a time point at which the second image encoding unit 70-2 encodes macroblock 164-5($t_5$).

Similarly, when macroblocks 164-6($t_6$) and 164-8($t_8$) have been encoded, the third image encoding unit 70-3 can encode macroblock 166-9($t_9$). While the third image encoding unit 70-3 encodes macroblock 166-9($t_9$), the first image encoding unit 70-1 encodes macroblock 162-9($t_9$), and the second image encoding unit 70-2 encodes macroblock 164-9($t_9$).

As described above, the exemplary embodiments provide the moving picture encoding apparatus 50, which can process image slices allocated to each image encoding unit in such a manner as to encode a plurality of image slices at the same time. The method for allocating image slices and encoding macroblocks, as described above, can be applied even to the moving picture decoding apparatus 100 according to the exemplary embodiment. In addition, an image slice division scheme, an encoding order of macroblocks, and an encoding scheme thereof, which will be described later with reference to FIG. 7, can be applied to the moving picture decoding apparatus 100, too.

For example, a time point at which the second image decoding unit 120-2 decodes macroblock 164-9($t_9$) and a time point at which the third image decoding unit 120-3 decodes macroblock 166-9($t_9$) are equal to each other.

FIGS. 7 to 12 are views illustrating moving picture encoding orders in image slices according to other exemplary embodiments.

Figure 7:
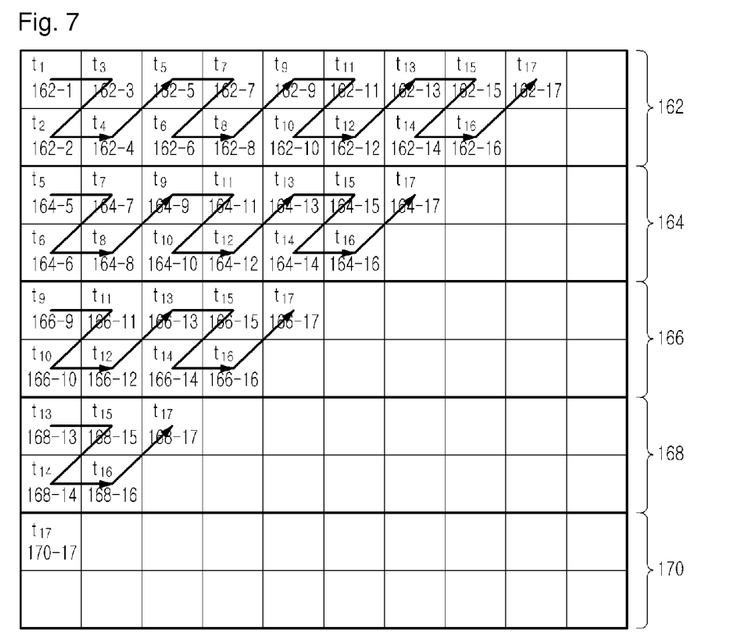
FIGS. 7 to 13 are views illustrating moving picture encoding orders in image slices according to other exemplary embodiments.

FIG. 7 shows a frame including five image slices 162, 164, 166, 168, and 170, as shown in FIG. 6. Referring to FIG. 7, the image encoder 70 encodes macroblocks, which are included in each image slice 162, 164, 166, 168, and 170, in a Z-shape along a horizontal direction within each corresponding image slice.

In FIG. 7, the first image encoding unit 70-1 encodes macroblock 162-11($t_{11}$) by making reference to macroblocks 162-9($t_9$) and 162-10($t_{10}$) at the same time as the second image encoding unit 70-2 encodes macroblock 164-11($t_{11}$) by making reference to pre-encoded macroblocks 162-7($t_7$), 162-8($t_8$), 164-9($t_9$), and 164-10($t_{10}$). Also, in this case, the third image encoding unit 70-3 encodes macroblock 166-11($t_{11}$) by making reference to pre-encoded macroblocks 164-7($t_7$), 164-8($t_8$), 166-9($t_9$), and 166-10($t_{10}$). In the same manner, the fourth image encoding unit 70-4 encodes macroblock 168-13($t_{13}$), which is included in the fourth image slice 168, through the use of macroblocks 166-11($t_{11}$) and 166-12($t_{12}$) included in the third image slice 166. In this case, it is assumed that one or more pre-encoded macroblocks have been stored in a memory (not shown) provided in advance in the moving picture encoding apparatus 50.

Figure 8:
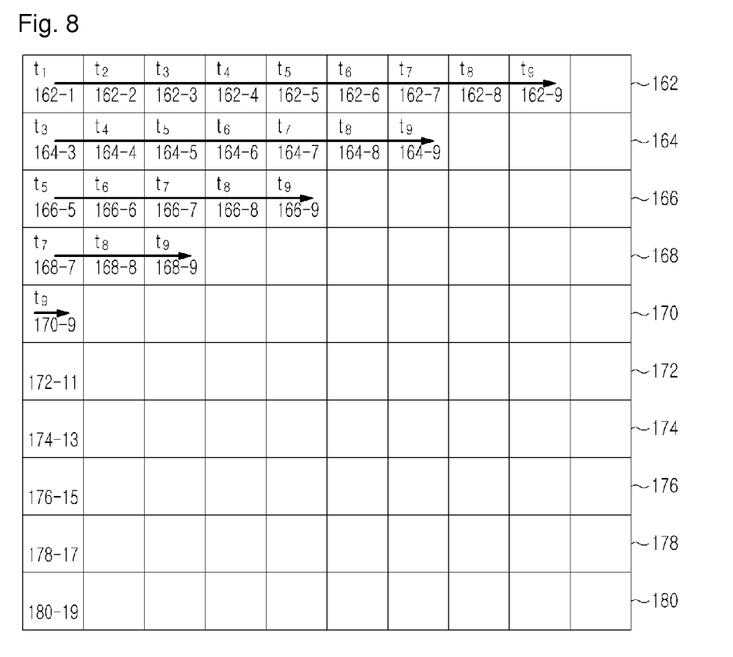

FIG. 8 is a view illustrating a frame including 10 image slices. Each image slice shown in FIG. 8 includes 10 macroblocks, differently from the image slices shown in FIGS. 6 and 7. According to the exemplary embodiment of FIG. 8, a macroblock can be encoded by making reference to at least one adjacent macroblock when the adjacent macroblock has been encoded in advance, similar to the cases of FIGS. 6 and 7.

For example, when macroblock 162-1 in a first image slice has been encoded, the first image encoding unit 70-1 can encode macroblock 162-2, which is an adjacent macroblock of macroblock 162-1. Also, when macroblocks 162-1 and 162-2 have been encoded, the first image encoding unit 70-1 can encode macroblock 162-3.

Referring to FIG. 8, when macroblocks 162-1 and 162-2 have been encoded, the synchronization controller 90 synchronizes the first image encoding unit 70-1 and the second image encoding unit 70-2 to encode macroblocks 162-3 and 164-3 at the same time. Also, when macroblocks 162-4 and 164-4 have been encoded by the first image encoding unit 70-1 and second image encoding unit 70-2, the synchronization controller 90 synchronizes the first image encoding unit 70-1, the second image encoding unit 70-2, and the third image encoding unit 70-3 to encode macroblocks 162-5, 164-5, and 166-5 at the same time.

The synchronization controller 90 controls a time point at which each image encoding unit encodes each macroblock in such a manner as described above, thereby controlling the image encoder 70, which includes a plurality of cores (not shown) and buffers (not shown), to efficiently encode an image divided in units of slices.

FIGS. 9 to 12 show cases where a frame having 10×10 macroblocks in the horizontal and vertical directions is divided into image slices in various manners. Referring to FIGS. 9 to 12, it can be understood that the encoding order of macroblocks included in image slices may vary depending on image division schemes.

Figure 9:
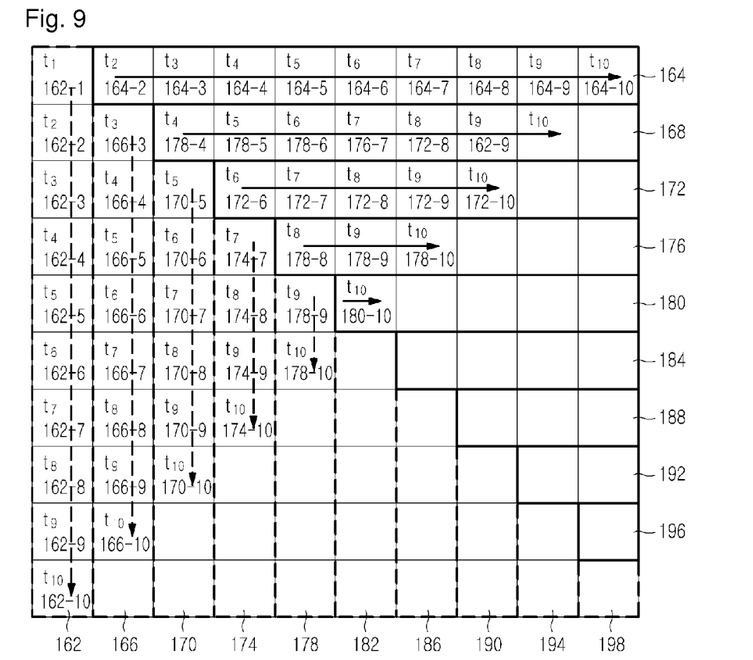

Referring to FIG. 9, ten macroblocks in the vertical direction among 10×10 macroblocks correspond to a first image slice 162; nine macroblocks in the horizontal direction among the remaining macroblocks, except for the first image slice 162, correspond to a second image slice 164; and nine macroblocks in the vertical direction among the remaining macroblocks, except for the first image slice 162 and the second image slice 164, correspond to a third image slice 166. That is, one frame of an image input to the moving picture encoding apparatus 50 is divided in units of slices in alternating the vertical and horizontal directions.

Also, referring to FIG. 9, each image slice is encoded in such a manner that, after macroblock 162-1($t_1$) in the first image slice 162 has been encoded, macroblocks 162-2($t_2$) and 164-2($t_2$) are simultaneously encoded, macroblocks 162-3 ($t_3$), 164-3($t_3$), and 166-3($t_3$) are simultaneously encoded, and then macroblocks 162-4($t_4$), 164-4($t_4$), 166-4($t_4$), and 168-4 ($t_4$) are simultaneously encoded.

Figure 10:
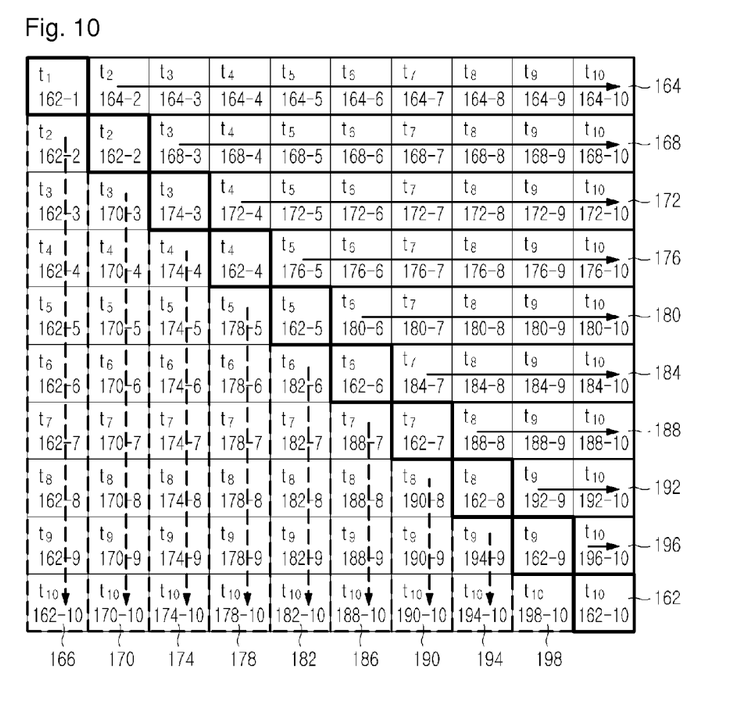

In the case of a frame shown in FIG. 10, after macroblock 162-1($t_1$) in a first image slice 162 is encoded first, macroblock 162-2($t_2$) in the first image slice 162, macroblock 164-2($t_2$) in a second image slice 164, and macroblock 166-2($t_2$) in a third image slice 166 are encoded. Thereafter, the synchronization controller 90 according to an exemplary embodiment controls the image encoder 70 to encode macroblock 162-3($t_3$) in the first image slice 162, macroblock 164-3($t_3$) in the second image slice 164, macroblock 166-3($t_3$) in the third image slice 166, and macroblock 168-3($t_3$) in a fourth image slice 168. The image encoder 70 encodes a plurality of image slices, which are included in a frame, in parallel in the aforementioned manner under the control of the synchronization controller 90.

Figure 11:
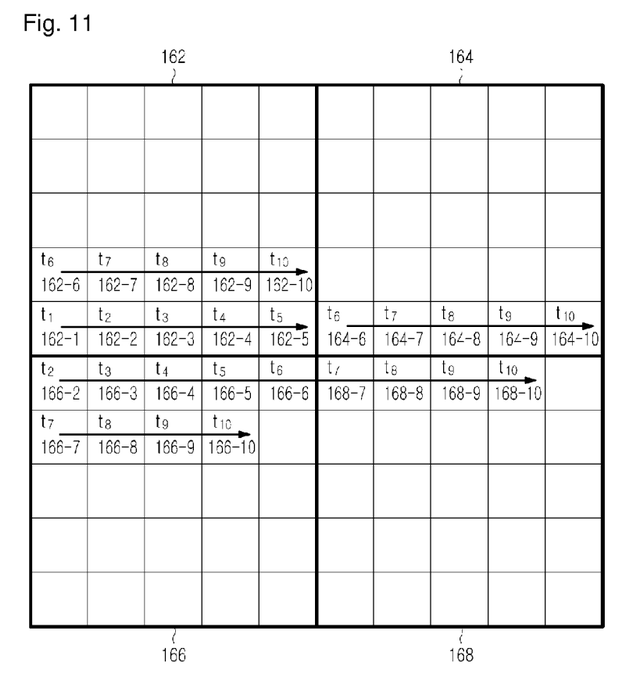
Figure 12:
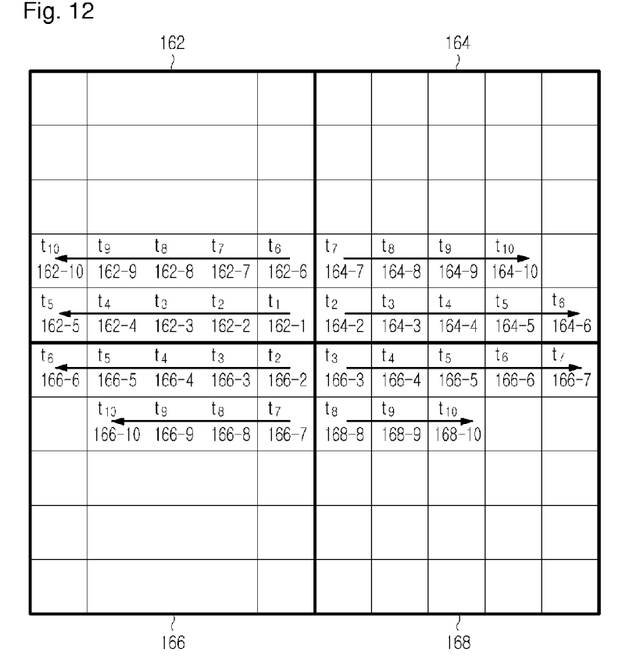

FIGS. 11 and 12 illustrate encoding orders of image slices when one frame includes four image slices 162, 164, 166, and 168.

Referring to FIG. 11, first, macroblocks 162-1($t_1$), 162-2 ($t_2$), 162-3($t_3$), 162-4($t_4$), and 162-5($t_5$) in a first image slice 162 are encoded in regular sequence, and macroblocks 166-2($t_2$), 166-3($t_3$), 166-4($t_4$), 166-5($t_5$), and 166-6($t_6$) in a third image slice 166 are encoded in regular sequence. When macroblock 162-5($t_5$) in the first image slice 162 and macroblock 166-5($t_5$) in the third image slice 166 have been encoded, the second image encoding unit 70-2 can encode macroblock 164-6($t_6$) in a second image slice 164 by making reference to macroblock 162-5($t_5$). Also, when macroblock 164-6($t_6$) in the second image slice 164 has been encoded, the fourth image encoding unit 70-4 can encode macroblock 168-7($t_7$) in a fourth image slice by making reference to macroblock 162-5($t_5$), macroblock 164-6($t_6$), and macroblock 166-6($t_6$) in the third image slice 166, wherein macroblock 166-6($t_6$) is encoded at the same time as macroblock 164-6($t_6$).

Referring to FIG. 12, it can be understood that macroblock 162-1 of a first image slice 162 is positioned in the center of a frame. Accordingly, when macroblock 162-1($t_1$) is encoded by the first image encoding unit 70-1, it is possible to encode macroblock 164-2 of a second image slice and macroblock 166-2 of a third image slice, which correspond to adjacent macroblocks of macroblock 162-1. The moving picture encoding apparatus 50 according to an exemplary embodiment progresses the encoding in a direction from the center of the frame to the edge of the frame.

Figure 13:
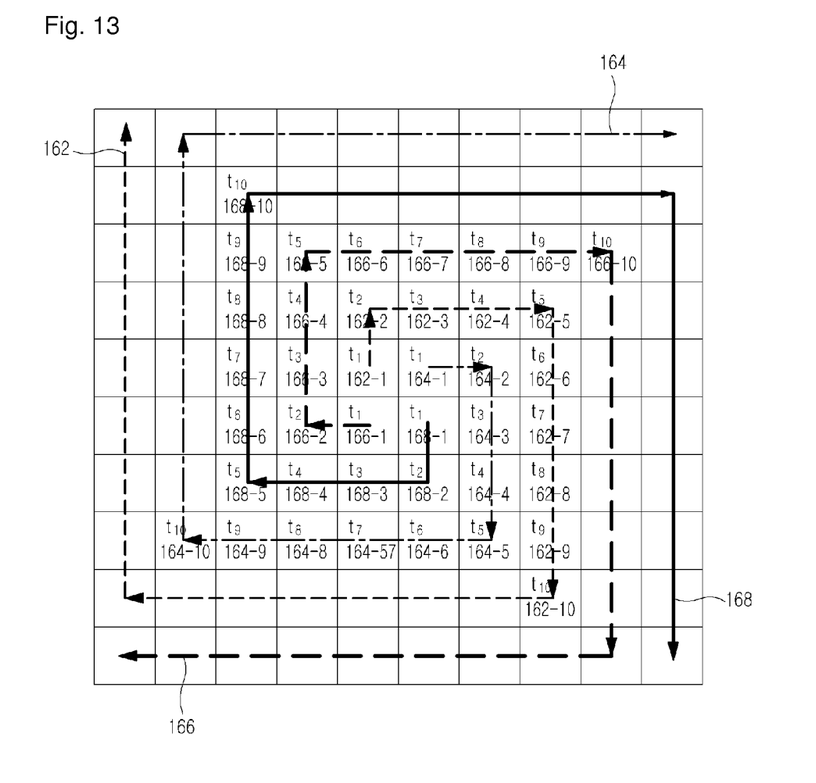

FIG. 13 is a view illustrating a case where the moving picture encoding apparatus 50 performs the encoding of macroblocks in a sequence progressing in the form of a spiral.

According to another exemplary embodiment shown in FIG. 13, a frame includes a first image slice 162, a second image slice 164, a third image slice 166, and a fourth image slice 168, wherein each image slice has the form of a spiral. According to the exemplary embodiment shown in FIG. 13, encoding is performed in such a manner that macroblocks 162-1($t_1$), 164-1($t_1$), 166-1($t_1$), and 168-1($t_1$) are encoded at the same time; macroblocks 162-2($t_2$), 164-2($t_2$), 166-2($t_2$), and 168-2($t_2$) are encoded at the same time; and then macroblocks 162-3($t_3$), 164-3($t_3$), 166-3($t_3$), and 168-3($t_3$) are encoded at the same time.

The image slice division methods as described above are just exemplary embodiments, and various modifications, additions and substitutions are possible to increase the encoding efficiency through the sharing of partial information between image slices. Therefore, the aspects of the exemplary embodiments are not limited to the aforementioned exemplary embodiments and accompanying drawings. In addition, it will be understood by those skilled in the art that, when macroblocks are encoded, the subjects of pre-encoded adjacent macroblocks may change in form and detail depending on image slice division schemes.

The invention claimed is:

1. A decoding method, the method comprising:
    obtaining split information from a bitstream;
    dividing a frame into a plurality of blocks based on the split information, the plurality of blocks comprising at least two rows;
    obtaining decoding information by decoding a second block in a first row; and
    decoding a third block in the first row and a first block in a second row using the decoding information.

2. The method of claim 1, wherein the third block in the first row and the first block in the second row are decoded in parallel.

* * * * *